United States Patent
Hong

(10) Patent No.: US 12,143,989 B2
(45) Date of Patent: Nov. 12, 2024

(54) METHOD FOR PERFORMING COMMUNICATION BY USING NON-TERRESTRIAL NETWORK, AND APPARATUS THEREFOR

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 536 days.

(21) Appl. No.: 17/613,726

(22) PCT Filed: Mar. 6, 2020

(86) PCT No.: PCT/KR2020/003148
§ 371 (c)(1),
(2) Date: Nov. 23, 2021

(87) PCT Pub. No.: WO2020/189932
PCT Pub. Date: Sep. 24, 2020

(65) Prior Publication Data
US 2022/0240283 A1    Jul. 28, 2022

(30) Foreign Application Priority Data

Mar. 15, 2019   (KR) .................. 10-2019-0029826
Mar. 3, 2020    (KR) .................. 10-2020-0026718

(51) Int. Cl.
*H04W 72/1273*   (2023.01)
*H04L 1/1812*    (2023.01)
(Continued)

(52) U.S. Cl.
CPC ....... *H04W 72/1273* (2013.01); *H04L 1/1812* (2013.01); *H04L 5/0051* (2013.01); *H04W 72/20* (2023.01); *H04W 84/06* (2013.01)

(58) Field of Classification Search
CPC . H04W 72/1273; H04W 72/20; H04W 84/06; H04W 72/23; H04L 1/1812;
(Continued)

(56) References Cited

U.S. PATENT DOCUMENTS

| 2014/0126512 A1 | 5/2014 | Kim et al. |
| 2019/0215862 A1* | 7/2019 | Kim ................ H04W 74/0841 |
| 2021/0006328 A1* | 1/2021 | Kim .................... H04W 72/23 |

OTHER PUBLICATIONS

InterDigital Inc., "Deactivating HARQ for Non-Terrestrial Networks", R1-1804857, 3GPP TSG RAN WG1 Meeting #92bis, Sanya, China, Apr. 16-20, 2018, pp. 1-3.
(Continued)

*Primary Examiner* — Thai Nguyen
(74) *Attorney, Agent, or Firm* — IP Legal Services, LLC

(57) ABSTRACT

Provided are apparatus and method for communication in a non-terrestrial network (NTN). The method may include: receiving, from a base station, HARQ process activation indication information indicating whether to activate an HARQ process operation; determining whether to perform the HARQ process operation for a downlink signal on the basis of information included in the downlink signal when the downlink signal is received from the base station if the HARQ process operation deactivation is configured by the HARQ process activation indication information; and transmitting, to the base station, feedback information for the downlink signal when performing the HARQ process operation for the downlink signal is determined.

11 Claims, 15 Drawing Sheets field of view of the satellite (or UAS platform)

(51) Int. Cl.
*H04L 5/00* (2006.01)
*H04W 72/20* (2023.01)
*H04W 84/06* (2009.01)

(58) Field of Classification Search
CPC ... H04L 5/0051; H04L 1/0027; H04L 1/1822; H04L 1/1896; H04L 5/0055; H04L 5/0096; H04L 1/1887
See application file for complete search history.

(56) References Cited

OTHER PUBLICATIONS

Nokia et al., "Consideration on HARQ Impact for NTN", R1-1805848, 3GPP TSG RAN WG1 Meeting #93, Busan, Korea, May 21-25, 2018, pp. 1-2.
Fraunhofer Iis et al., "NR-NTN: HARQ in Satellite Systems", R2-1817757, 3GPP TSG-RAN WG2 Meeting #104, Spokane, USA, Nov. 12-16, 2018, pp. 1-4.
Ericsson, "On HARQ for NTN", R2-1901560, 3GPP TSG-RAN WG2 #105, Athens, Greece, Feb. 25-Mar. 1, 2019, pp. 1-4.
Korean Intellectual Property Office, International Search Report of International Application No. PCT/KR2020/003148, Jun. 17, 2020.
Korean Intellectual Property Office, Written Opinion of International Application No. PCT/KR2020/003148, Jun. 17, 2020.

* cited by examiner

FIG.11

| Platforms | Altitude range | Orbit | Typical beam footprint size |
|---|---|---|---|
| Low-Earth Orbit (LEO) satellite | 300 – 1500 km | Circular around the earth | 100 – 500 km |
| Medium-Earth Orbit (MEO) satellite | 7000 – 25000 km | | 100 – 500 km |
| Geostationary Earth Orbit (GEO) satellite | 35 786 km | notional station keeping position fixed in terms of elevation/azimuth with respect to a given earth point | 200 – 1000 km |
| UAS platform (including HAPS) | 8 – 50 km (20 km for HAPS) | | 5 – 200 km |
| High Elliptical Orbit (HEO) satellite | 400 – 50000 km | Elliptical around the earth | 200 – 1000 km |

METHOD FOR PERFORMING COMMUNICATION BY USING NON-TERRESTRIAL NETWORK, AND APPARATUS THEREFOR

CROSS REFERENCE TO RELATED APPLICATIONS

This application is a National Stage Patent Application of PCT International Patent Application No. PCT/KR2020/003148 (filed on Mar. 6, 2020) under 35 U.S.C. § 371, which claims priority to Korean Patent Application Nos. 10-2019-0029826 (filed on Mar. 15, 2019), and 10-2020-0026718 (filed on Mar. 3, 2020), the teachings of which are incorporated herein in their entireties by reference.

TECHNICAL FIELD

The disclosure relates techniques for performing communication using a non-terrestrial network between a user equipment (UE) and a base station.

BACKGROUND ART

The amount of data transmission and reception using wireless communication technology is increasing rapidly according to the increase in the spread of cellular phones and the like, and various types of wireless communication devices are introduced. In addition, as the importance of low latency is highlighted, development of a next-generation wireless communication technology (New RAT) after LTE technology is in progress.

In addition, the number of terminals (e.g., UEs) performing communication using the wireless communication technology is increasing abruptly, and there is a large demand for communication in various environments and locations. In this situation, it is necessary to provide a communication service with a further wider coverage and even in an environment where a base station connected by wire may not be established.

To this end, many researches have been conducted on non-terrestrial networks that are wirelessly linked to core networks in the air, not base stations built on the ground. The non-terrestrial network refers to a network or segment of a network that uses airborne vehicles such as HAPS (High Altitude Platform) or spaceborne vehicles such as satellites for transmission.

In the case of the non-terrestrial network, the distance between the terminal and the base station (e.g., network node, such as a satellite) is very long. Accordingly, it takes a relatively long time to transmit and receive data. In addition, the location of the cell may be continuously changed according to the movement of the spaceborne vehicle and the terminal. Therefore, when the HARQ feedback operation in the non-terrestrial network is performed as in the related art, the data transmission rate may be significantly reduced due to the propagation delay between the terminal and the satellite

DETAILED DESCRIPTION OF THE INVENTION

Technical Problem

The embodiments provide a method and an apparatus o perform communication using a non-terrestrial network between a user equipment (UE) and a base station.

Technical Solution

According to an embodiment of the present disclosure, there is provided a method for performing communication by a user equipment (UE) using a non-terrestrial network (NTN). The method may include receiving, from a base station, HARQ process activation indication information indicating whether to activate an HARQ process operation, determining whether to perform the HARQ process operation on a downlink signal based on information included in the downlink signal if the downlink signal is received from the base station when HARQ process operation deactivation is configured by the HARQ process activation indication information, and transmitting, to the base station, feedback information for the downlink signal if it is determined to perform the HARQ process operation on the downlink signal.

According to another embodiments, there is provided a method for controlling communication of a UE by a base station using a non-terrestrial network (NTN). The method may include transmitting, to the UE, HARQ process activation indication information indicating whether to activate an HARQ process operation, transmitting a downlink signal to the UE, and if the UE determines to perform an HARQ process operation on the downlink signal, receiving feedback information for the downlink signal from the UE, wherein the UE determines whether to perform the HARQ process operation on the downlink signal based on information included in the downlink signal if the downlink signal is received when HARQ process operation deactivation is configured by the HARQ process activation indication information.

According to still another embodiment of the present disclosure, there is provided a UE performing communication using a non-terrestrial network (NTN). The UE may include a receiver receiving, from a base station, HARQ process activation indication information indicating whether to activate an HARQ process operation, a controller determining whether to perform the HARQ process operation on a downlink signal based on information included in the downlink signal if the downlink signal is received from the base station when HARQ process operation deactivation is configured by the HARQ process activation indication information, and a transmitter transmitting, to the base station, feedback information for the downlink signal if it is determined to perform the HARQ process operation on the downlink signal.

According to yet still another embodiment of the present disclosure, there is provided a base station controlling communication of a UE using a non-terrestrial network (NTN). The base station may include a transceiver transmitting, to the UE, an HARQ process activation indication information indicating whether to activate an HARQ process operation and transmitting a downlink signal to the UE and a receiver receiving feedback information for the downlink signal from the UE if the UE determines to perform the HARQ process operation on the downlink signal, wherein when HARQ process operation deactivation is configured by the HARQ process activation indication information, if the downlink signal is received, the UE determines whether to perform the HARQ process operation on the downlink signal based on information included in the downlink signal.

Advantageous Effects

The embodiments may provide the method and the apparatus to perform communication using a non-terrestrial network between a user equipment (UE) and a base station.

BRIEF DESCRIPTION OF DRAWINGS

FIG. 11 is types of NTN platform.

MODE FOR CARRYING OUT THE INVENTION

Figure 1:
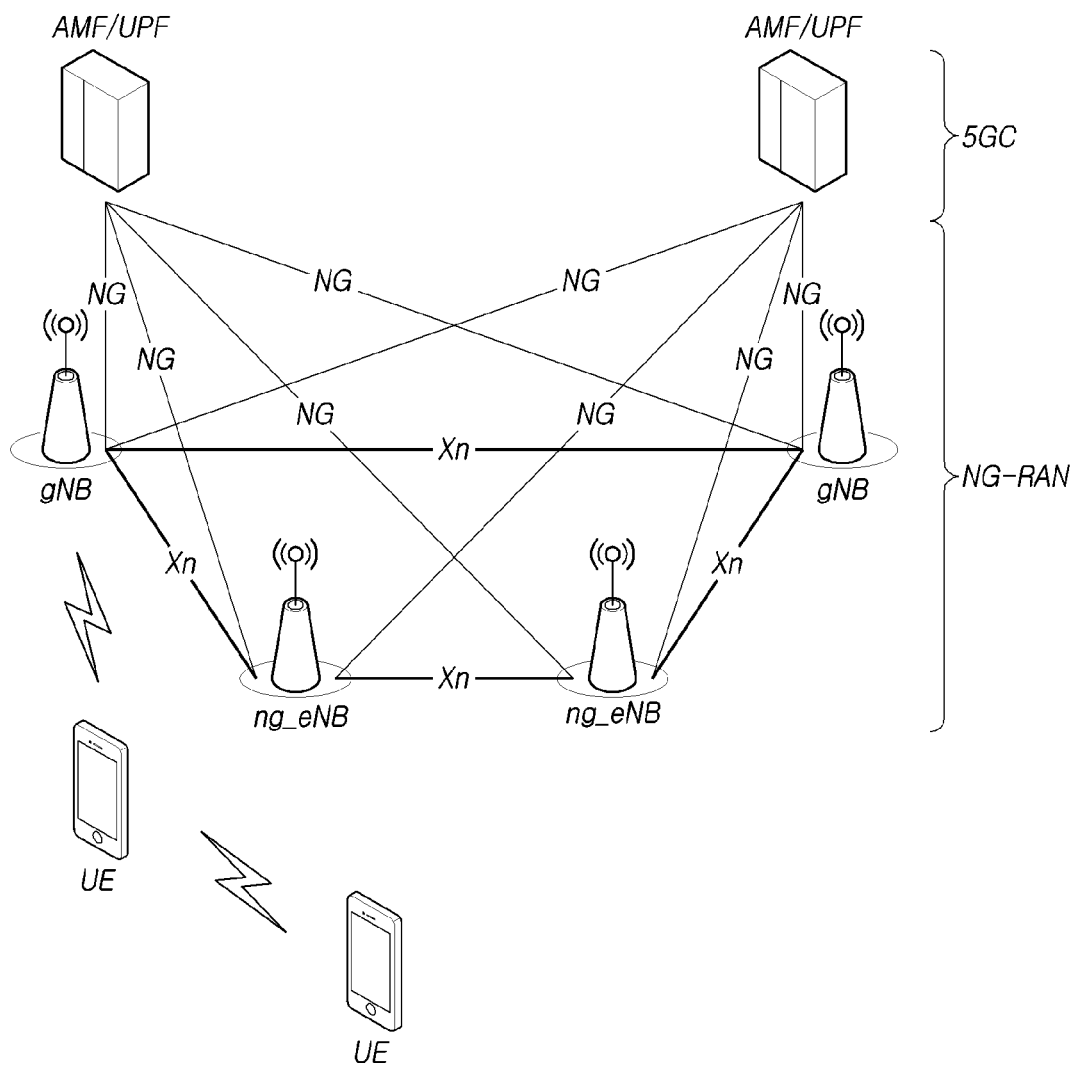
FIG. 1 is a view schematically illustrating an NR wireless communication system in accordance with embodiments of the disclosure.

Hereinafter, some embodiments of the disclosure will be described in detail with reference to the accompanying illustrative drawings. In the drawings, like reference numerals are used to denote like elements throughout the drawings, even if they are shown on different drawings. Further, in the following description of the disclosure, a detailed description of known functions and configurations incorporated herein will be omitted when it may make the subject matter of the disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, Wi-Fi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-

OFDM for uplink transmission. The OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

Figure 2:
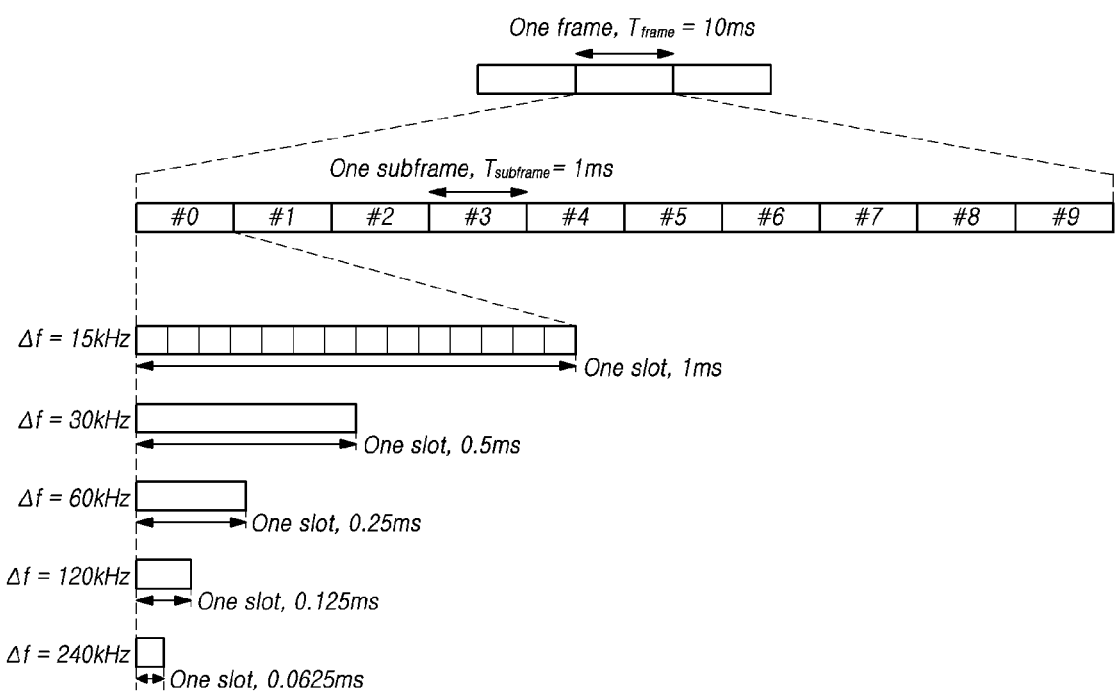
FIG. 2 is a view schematically illustrating a frame structure in an NR system in accordance with embodiments of the disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR, a frame is defined to include 10 subframes each having the same length of 1 ms and have a length of 10 ms. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a hybrid automatic repeat request (HARQ) delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by indicating, using the SFI, the index of a table configured through UE-specific RRC signaling. Further, the base station may dynamically indicate the slot format through downlink control information (DCI) or may statically or quasi-statically indicate the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port may be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
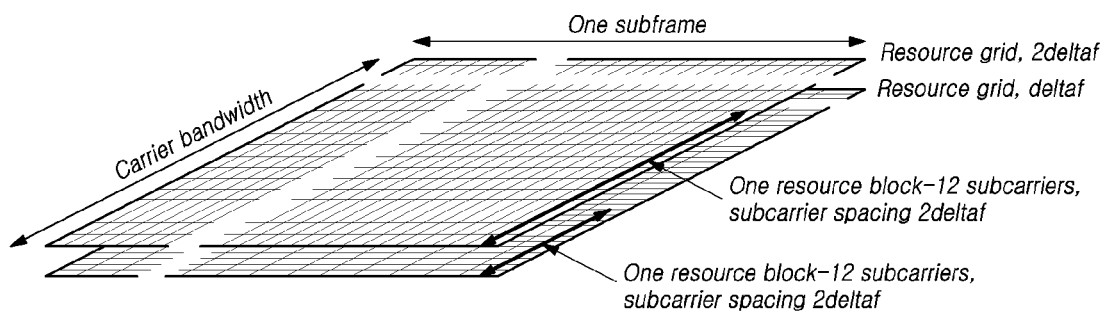
FIG. 3 is a view for explaining resource grids supported by a radio access technology in accordance with embodiments of the disclosure.

FIG. 3 illustrates resource grids supported by a radio access technology in accordance with embodiments of the disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
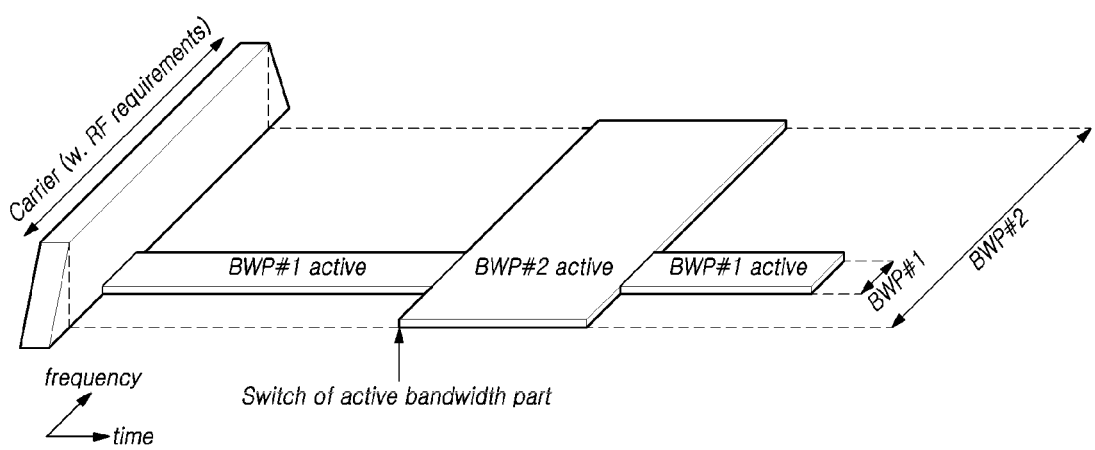
FIG. 4 is a view for explaining bandwidth parts supported by a radio access technology in accordance with embodiments of the disclosure.

FIG. 4 illustrates bandwidth parts supported by a radio access technology in accordance with embodiments of the disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
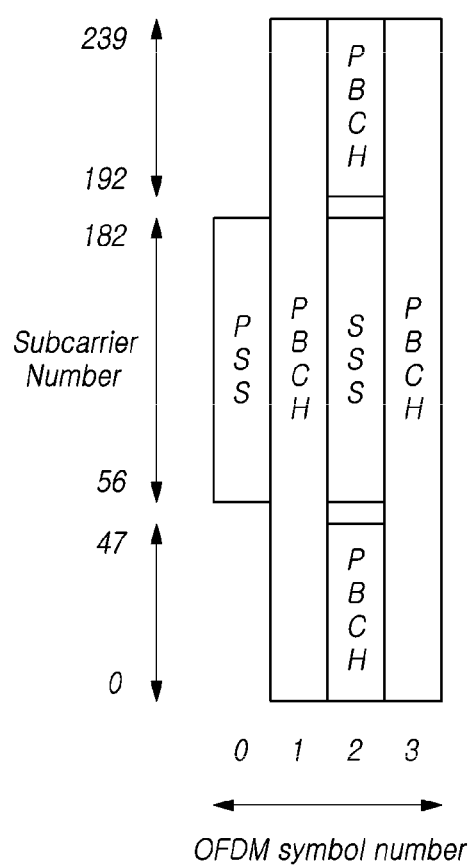
FIG. 5 is a view illustrating an example of a synchronization signal block in a radio access technology in accordance with embodiments of the disclosure.

FIG. 5 illustrates an example of a synchronization signal block in a radio access technology in accordance with embodiments of the disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
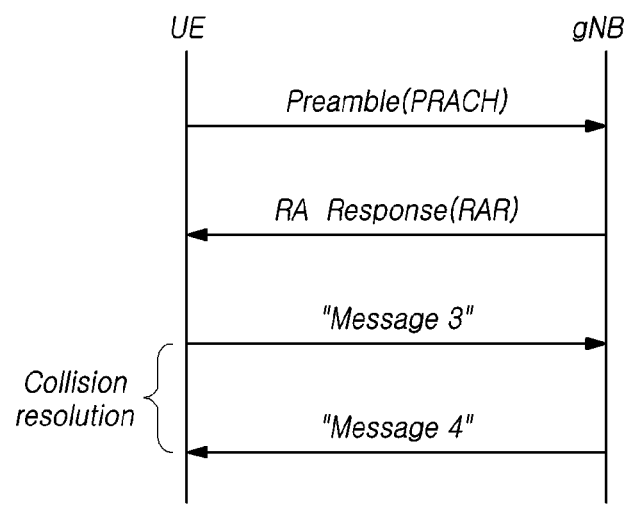
FIG. 6 is a signal diagram for explaining a random access procedure in a radio access technology in accordance with embodiments of the disclosure.

FIG. 6 is a view for explaining a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
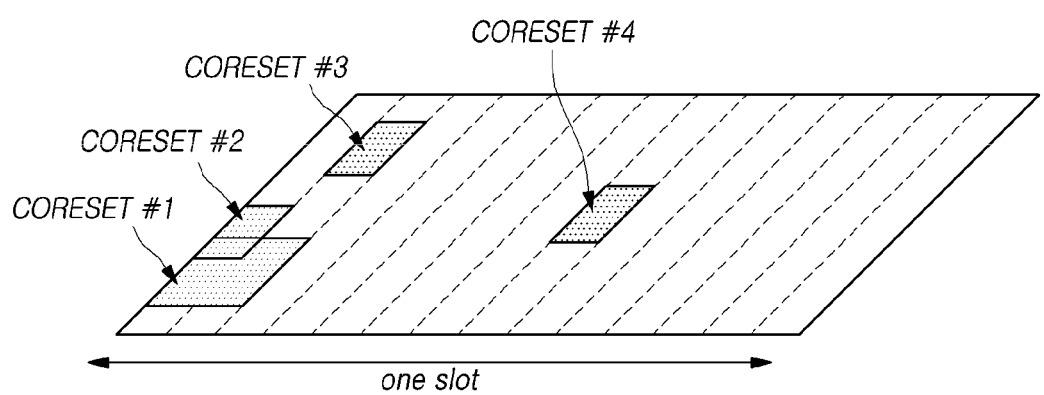
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., indicated, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR(New Radio)

3GPP introduced NR, a next-generation wireless communication technology. That is, NR is radio access technology that may provide an enhanced data rate compared to LTE and may satisfy various QoS requirements required for specific and detailed usage scenarios. In particular, as a representative NR usage scenario, eMBB (enhancement Mobile Broadband), mMTC (massive MTC) and URLLC (Ultra Reliable and Low Latency Communications) have been defined. In order to meet the requirements for each scenario, it is required to design a frame structure more flexible as compared to that of LTE. The frame structure of the NR supports a frame structure based on multiple subcarriers. The basic subcarrier spacing (SCS) is 15 kHz, and a total of 5 SCS types are supported at 15 kHz*2^n.

Figure 8:
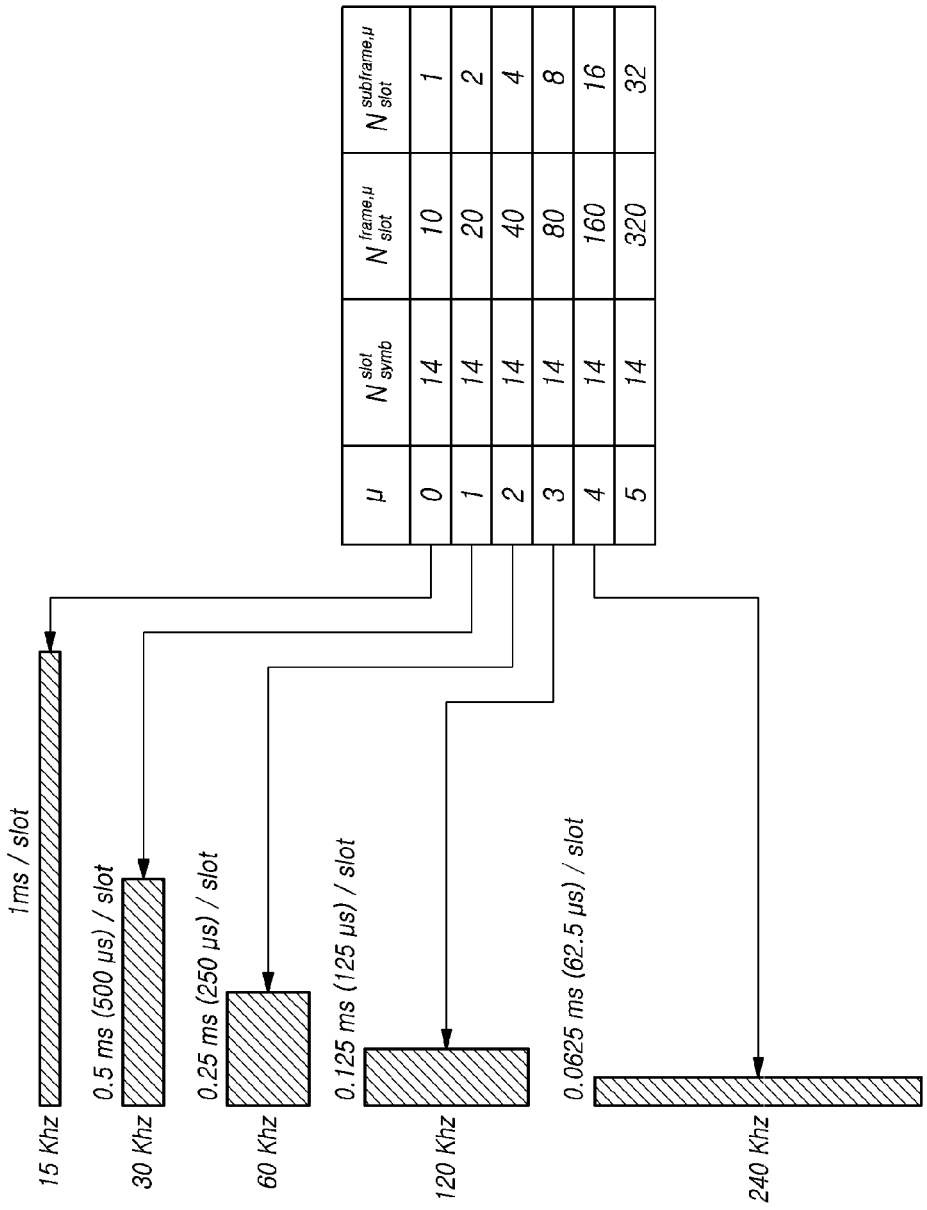
FIG. 8 is a view illustrating different subcarrier spacings arranged at a symbol level.

FIG. 8 is a view illustrating different subcarrier spacings arranged at a symbol level.

As shown in FIG. 8, the length of the time axis of the slot varies depending on the numerology. That is, the shorter the slot length, the larger the SCS. In this case, the number (y value) of OFDM symbols constituting a corresponding slot is determined to be 14 (e.g., y=14) regardless of the SCS value in the case of normal CP. Therefore, one slot is made up of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in a numerology (or SCS), a mini-slot is defined. The mini-slot is constituted of a smaller number of symbols than the typical slot described above. For minislot-based uplink/downlink data transmission/reception, a short-length time-domain scheduling interval may be configured, or a long-length time-domain scheduling interval for uplink/downlink data transmission/reception may be configured via slot aggregation. In the case of transmission and reception of latency-sensitive data, such as URLLC, it is difficult to satisfy the latency requirements if scheduling is performed in slot units which are based on 1 ms (14 symbols) as defined in the numerology-based frame structure which has a small SCS value, e.g., 15 kHz. Thus, a mini-slot is defined to be constituted of a smaller number of OFDM symbols than the slot constituted of 14 symbols. Based thereupon, scheduling capable of meeting the URLLC requirements may be carried out.

In NR, the following structure is supported on the time axis. Unlike LTE, the basic scheduling unit is changed to the above described slot in NR. Also, regardless of the subcarrier spacing, a slot made up of 14 OFDM symbols. On the other hand, it supports a non-slot structure (mini-slot structure) composed of 2, 4, and 7 OFDM symbols, which are smaller scheduling units.

The non-slot structure may be used as a scheduling unit for URLLC service.

Radio frame: Fixed 10 ms regardless of the numerology.

Subframe: Fixed 1 ms as a reference for time duration. It is not used for data/control scheduling unit, different from the LTE.

Slot: Mainly used for eMBB. It includes 14 OFDM symbols.

Non-slot (i.e., mini-slot): Mainly used for URLLC, but not limited to URLLC only. It includes 2, 4, or 7 OFDM symbols.

One TTI duration: A Time duration for data/control channel transmission. A number of OFDM symbols per a slot/non-slot in the time main.

NR HARQ (Hybrid ARQ)

The MAC protocol performs an error correction function through HARQ.

Figure 9:
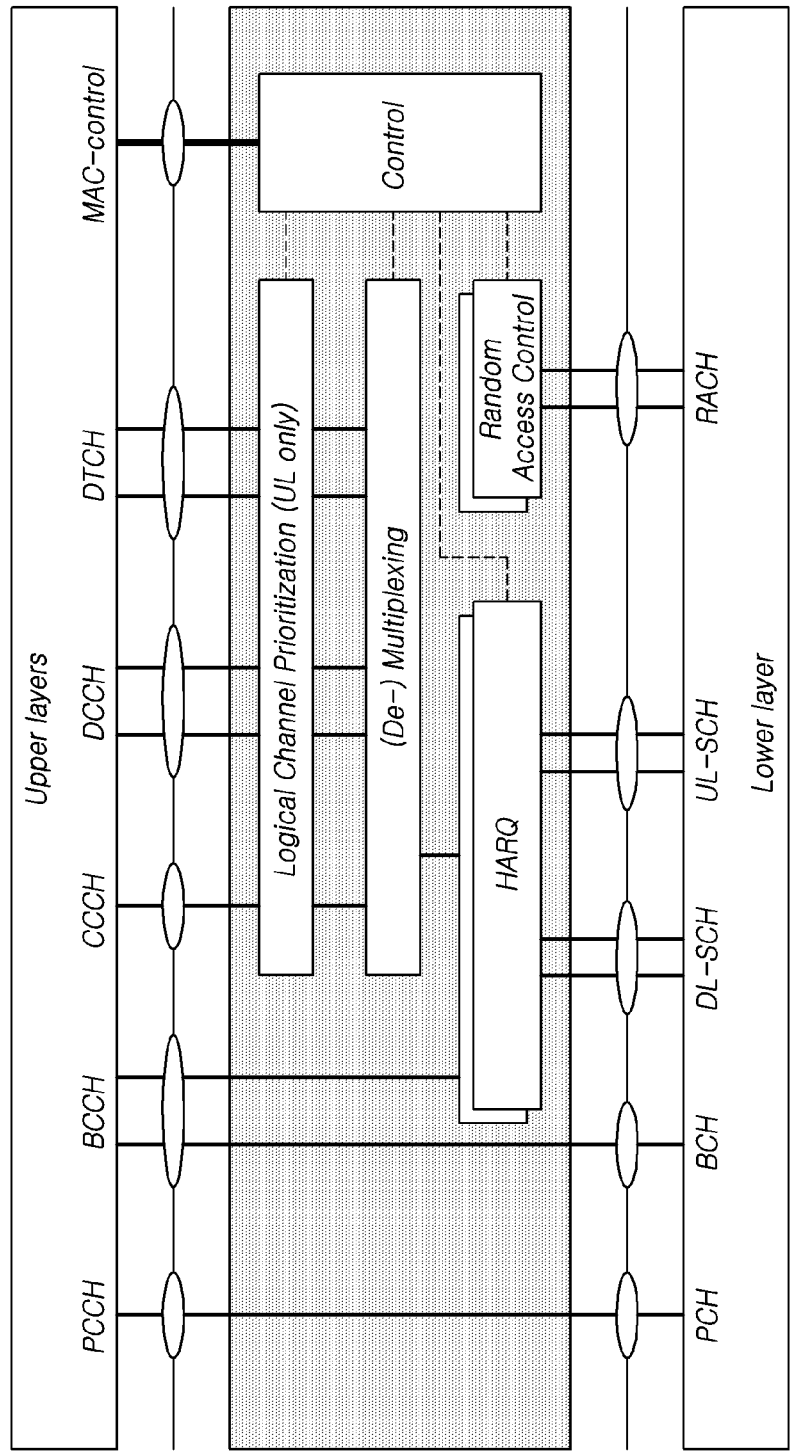
FIG. 9 illustrates an MAC structure in NR.

FIG. 9 is a view schematically illustrating an NR MAC structure. Referring to FIG. 9, Asynchronous Incremental Redundancy Hybrid ARQ is supported in downlink transmission for NR. The base station may provide an HARQ-ACK feedback timing to the UE dynamically in DCI or semi-statically in the RRC configuration. The MAC entity may include one HARQ entity for each serving cell, and each HARQ entity maintains 16 downlink HARQ processes (or processors). NR supports Asynchronous Incremental Redundancy Hybrid ARQ in uplink transmission. The base station uses the uplink grant on DCI to schedule uplink transmission and retransmission. The MAC entity may include one HARQ entity for each serving cell, and each HARQ entity maintains 16 uplink HARQ processes (or processors).

Non-Terrestrial Network

The non-terrestrial network refers to a network or segment of a network that uses airborne vehicles such as HAPS (High Altitude Platform) or spaceborne vehicles such as satellites for transmission.

Spaceborne vehicles: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites).

Airborne vehicles: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.

The 3GPP developed and introduced a technology that supports NR operation in the non-terrestrial network using the aforementioned satellite or air transport vehicle. However, in the non-terrestrial network, the distance between a base station and a UE is longer than that of a terrestrial network using a terrestrial base station. Accordingly, a very large round trip delay (RTD) may occur. For example, in an NTN scenario using GEO located at an altitude of 35,768 km, the RTD is known to be 544.751 ms, and in an NTN scenario using HAPS located at an altitude of 229 km, the RTD is known to be 3.053 ms. In addition, the RTD in the NTN scenario using the LEO satellite system may appear up to 25.76 ms. As described above, in order to perform a communication operation to which the NR protocol is applied in the non-terrestrial network, there is a demand of a technology for supporting the base station and the UE to perform the NR operation even under such propagation delay.

Figure 10:
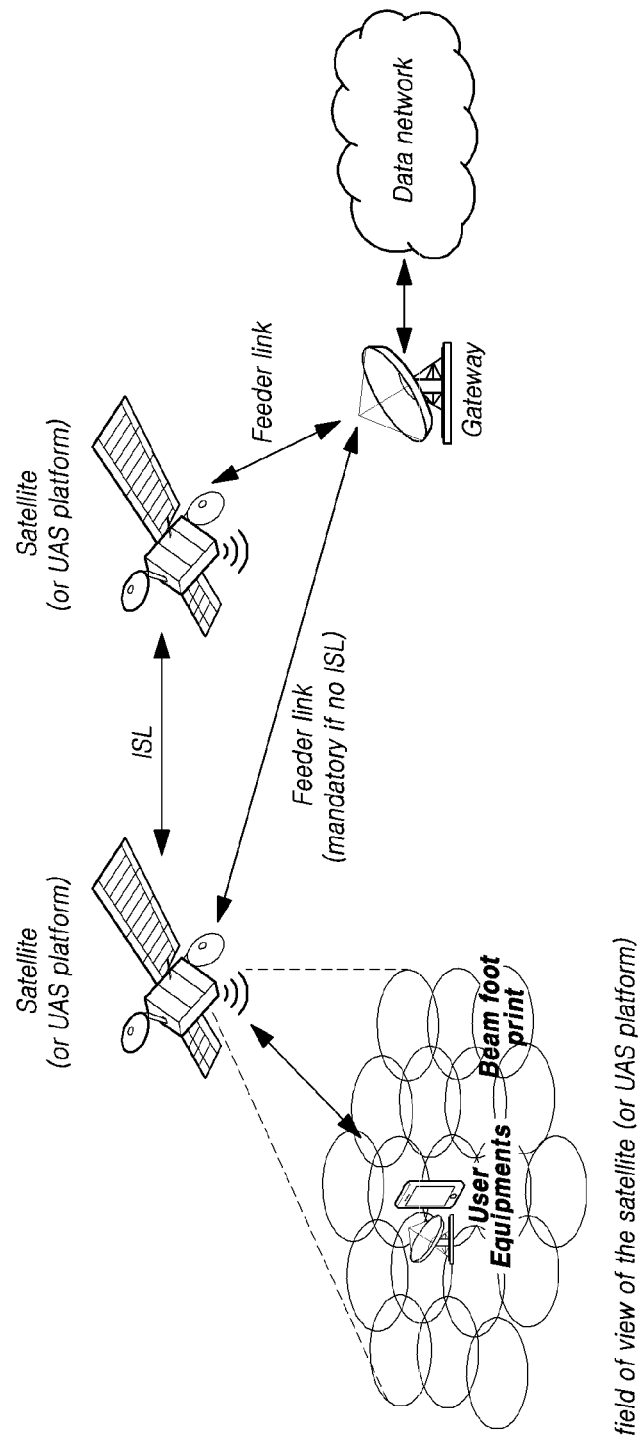
FIG. 10 illustrates an exemplary NTN scenario.

FIG. 10 exemplarily illustrates an NTN scenario to which the embodiments may be applied.

Referring to FIG. 10, the non-terrestrial network (NTN) may be implemented in various ways as follows.

Scenario A: Transparent GEO (NTN beam foot print fixed on earth)

Scenario B: Regenerative GEO (NTN beam foot print fixed on earth)

Scenario C1: Transparent LEO (NTN beam foot print fixed on earth)

Scenario C2: Transparent LEO (NTN beam foot print moving on earth)

Scenario D1: Regenerative LEO (NTN beam foot print fixed on earth)

Scenario D2: Regenerative LEO (NTN beam foot print moving on earth)

Here, a transparent payload or a regenerative payload is defined as follows.

A transparent payload: Radio Frequency filtering, Frequency conversion and amplification. Hence, the waveform signal repeated by the payload is un-changed;

A regenerative payload: Radio Frequency filtering, Frequency conversion and amplification as well as demodulation/decoding, switch and/or routing, coding/modulation. This is effectively equivalent to having all or part of base station functions (e.g., gNB) on board the satellite (or UAS platform).

As shown in FIG. 10, the beam generated by the satellite generates multiple beams for a given service area bounded by the field of view of the satellite. In other words, the satellite (or UAS platform) generate beams typically generate several beams over a given service area bounded by its field of view. The footprint of the beam is typically elliptical.

FIG. 11 illustrates the type of NTN platform to which the embodiments may be applied.

FIG. 11 shows a typical beam footprint size for each type of NTN platform. For example, the LEO satellite has a beam size in the range of 100-500 km, and each satellite and UAS platform may have a different beam size according to the range and orbit of the operating altitude.

On the other hand, due to the distance between the UE and the satellite, if the NTN uses the NR HARQ procedure as it is, the packet may be delayed as HARQ stalling in the error correction process through the HARQ operation. For example, when HARQ operation is performed through 16 parallel HARQ processes provided in NR, a problem may occur due to packet delay. Meanwhile, it is difficult to increase the number of HARQ processes because an additional cost is required for the UE. In addition, the base station transmits the HARQ process ID to the UE through the DCI. In order to distinguish the HARQ process ID, more bits must be allocated to the DCI to distinguish the HARQ process ID.

The present disclosure is to solve this problem and introduces a method and apparatus for effectively transmitting and receiving data by controlling the HARQ operation through the non-terrestrial network.

In this disclosure, a HARQ control method based on the NR radio access technology is described as a reference. However, the embodiments may be also applied to any radio access technology. In addition, the embodiments are described based on the HARQ control method in the interface between the UE and the base station on the non-terrestrial network. However, the embodiments may be also applied to the HARQ control through the interface between the UE and the base station or the interface (e.g., PC5) between UEs on the terrestrial network. Even if the UE operation content related to the definition of the corresponding information element is not included in the disclosure, the corresponding content specified in the standard may be combined and performed in this embodiment. The embodiments described below may be implemented individually or by any combination of some or all of the respective embodiments.

On the other hand, the base station in the disclosure may mean a public entity such as a satellite that transmits and receives information to the UE in the NTN situation. Alternatively, the base station may refer to a terrestrial entity that transmits and receives data transmitted/received through an aerial entity such as the satellite. That is, the base station means an entity that transmits and receives the data to and from the UE in the NTN situation, and there is no limitation on the term.

As described above, due to the limited number of HARQ processes, it may be difficult to apply the HARQ process as the distance between the UE and the satellite increases, such as GEO or MEO. To this end, it is possible to control to stop the HARQ process of the UE from operating. For convenience of description, stop operating the HARQ process is referred to as HARQ turn off or HARQ deactivation. This is for convenience of description, it may be replaced with the name of any other function that may be triggered as the HARQ process is not operated, such as HARQ disable, no Uplink HARQ feedback, HARQ feedback in the UE for downlink transmission, no Uplink HARQ retransmission, or HARQ uplink retransmission disable, without limitations thereto. In contrast, in the case of UAS platform and LEO, the delay due to the HARQ process may not be significant. Further, the HARQ process has the advantage of soft combining gain. Therefore, even in the case of NTN, there may exist a case in which it is desirable to operate the HARQ process (enable/turn on/Uplink HARQ feedback). Accordingly, it may be desirable for the base station to selectively configure HARQ turn off/turn on to the UE.

To perform HARQ turn-off-based operation by using the typical standard, the base station may always toggle New Data Indicator (NDI) for uplink or downlink to schedule new transmission. For example, the base station may obtain the same result of turning off HARQ by performing scheduling not to trigger HARQ retransmission. If the HARQ retransmission is not triggered, the UE does not need to provide uplink HARQ feedback for downlink transmission. However, to support flexible configuration, it is preferable that the base station may be able to configure HARQ turn off in the UE. For example, the base station may not perform HARQ feedback for downlink transmission by configuring HARQ turn off to the UE through an RRC message (e.g., RRC reconfiguration). HARQ feedback could provide several functions. Therefore, for an effective HARQ operation in such a configuration, it is necessary to design a selective HARQ feedback operation.

Hereinafter, various embodiments of the base station for dynamically controlling the above-described HARQ process operation of the UE will be described with the accompanying drawings.

Figure 12:
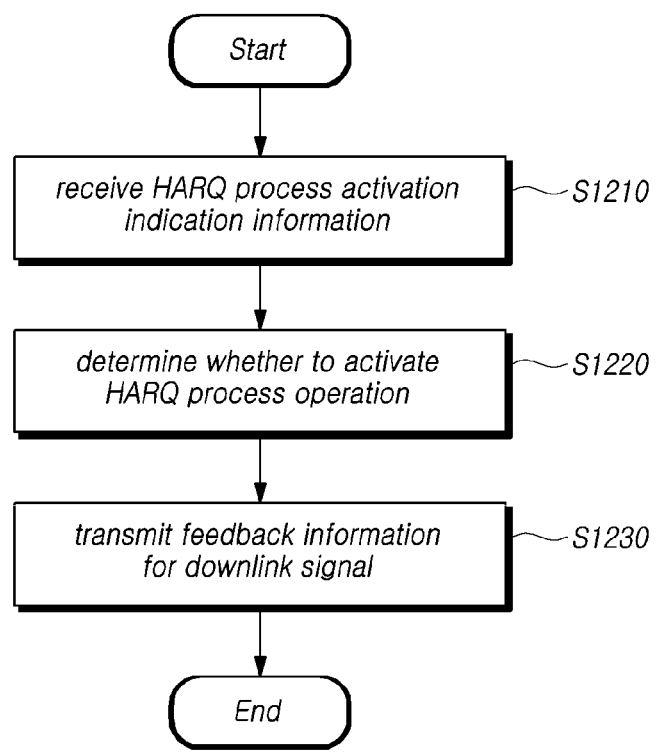
FIG. 12 is a flowchart for describing operations of a UE according to an embodiment.

FIG. 12 is a flowchart for describing operations of a UE according to an embodiment.

Referring to FIG. 12, a UE performing communication using a non-terrestrial network (NTN) may perform receiving HARQ process activation indication information for indicating (e.g., instructing) whether to activate the HARQ process operation from the base station at step S1210.

The HARQ process activation indication information may include information for instructing the UE whether to activate the HARQ process operation. For example, the HARQ process activation indication information may be included in the RRC message. Alternatively, the HARQ process activation indication information may be included in the MAC CE signaling information. Alternatively, the HARQ process activation indication information may be included in the downlink control information.

For example, the HARQ process activation indication information may include information for instructing whether to activate UE-specifically. In other words, all HARQ processes configured in the corresponding UE may deactivate uplink feedback for downlink transmission. Alternatively, all HARQ processes configured in the corresponding UE may deactivate uplink retransmission.

As another example, the HARQ process activation indication information may include information for indicating (e.g., instructing) whether to activate each HARQ process (or processor). In other words, the HARQ process activation indication information may indicate whether to activate for each HARQ process identification information. Alternatively, the HARQ process activation indication information may indicate whether to activate for each logical channel identification information or radio bearer identification information. Alternatively, the HARQ process activation indication information may indicate whether to activate, with the HARQ process identification information associated with logical channel identification information or radio bearer identification information.

When the HARQ process activation indication information is received, the UE may configure the HARQ process by applying the HARQ process activation indication information.

In case that HARQ process operation is deactivated by the HARQ process activation indication information, the UE may perform determining whether to perform the HARQ process on a downlink signal based on information included in the downlink signal when receiving the downlink signal from the base station at step S1220.

For example, even when the HARQ process is in an inactive state according to the HARQ process activation indication information, the UE may dynamically determine whether to perform the HARQ process operation based on information included in the downlink signal. Here, the downlink signal may mean a PDCCH including downlink control information or a PDSCH including downlink data, and it may mean various signals that the base station transmits to the UE.

For example, when the downlink signal includes information for indicating (e.g., instructing) activation or deactivation of downlink semi-persistent scheduling (SPS), the UE may determine to perform the HARQ process operation on the downlink signal. Alternatively, if information indicating SPS activation or deactivation is received, the UE may control the HARQ process to be performed even when the HARQ process is in an inactive state by the RRC message. Alternatively, when information indicating SPS activation or deactivation is received, the UE may perform operation for transmitting the MAC CE including identification information identifying that the information has been received to the base station.

As another example, when the downlink signal includes information for indicating (e.g., instructing) activation or deactivation of one or more uplink grants configured in the UE, the UE may determine to perform the HARQ process operation on the downlink signal. Information for indicating (e.g., instructing) activation or deactivation of one or more uplink grants may mean uplink grant type 2. As described above, if uplink grant type 2 is received, the UE may control the HARQ process to be performed even when the HARQ process is in an inactive state by the RRC message. Alternatively, if uplink grant type 2 is received, the UE may perform operation for transmitting the MAC CE including identification information identifying that the information has been received to the base station.

As another example, when the downlink signal is information for indicating (e.g., instructing) activation or deactivation of one or more SRS resources configured in the UE or information for indicating (e.g., instructing) activation or deactivation of a channel state report, the UE may determine to perform the HARQ process operation on the downlink signal. As described above, if information for indicating (e.g., instructing) activation or deactivation for one or more SRS resources is received, the UE may control the HARQ process to be performed even when the HARQ process is controlled as an inactive state by the RRC message. Likewise, if information indicating activation or deactivation of channel state report is received, the UE may control the HARQ process to be performed even when the HARQ process is controlled to be an inactive state by the RRC message. Alternatively, if information for indicating (e.g., instructing) activation or deactivation for one or more SRS resources or information for indicating (e.g., instructing) activation or deactivation of channel state report is received, the UE may perform operation for transmitting the MAC CE including identification information identifying that the information has been received to the base station.

If it is determined to perform the HARQ process operation on the downlink signal, the UE may perform transmitting feedback information for the downlink signal to the base station at step S1230.

For example, the feedback information for the downlink signal, including the reception identification information for the downlink signal, may be transmitted through the MAC CE. Alternatively, the feedback information for the downlink signal, including HARQ feedback information generated as a result of the HARQ process operation on the downlink signal, may be transmitted through the uplink control channel. Whether to use the transmission using the MAC CE or the transmission using the uplink control channel may be determined according to the type of the downlink signal described above or may be determined by the control of the base station.

Through this, the base station may control the HARQ process to be dynamically operated even when the HARQ process operation is controlled to be deactivated in the UE. Hereinafter, base station operations corresponding to the above-described UE operations will be described with reference to FIG. 13.

Figure 13:
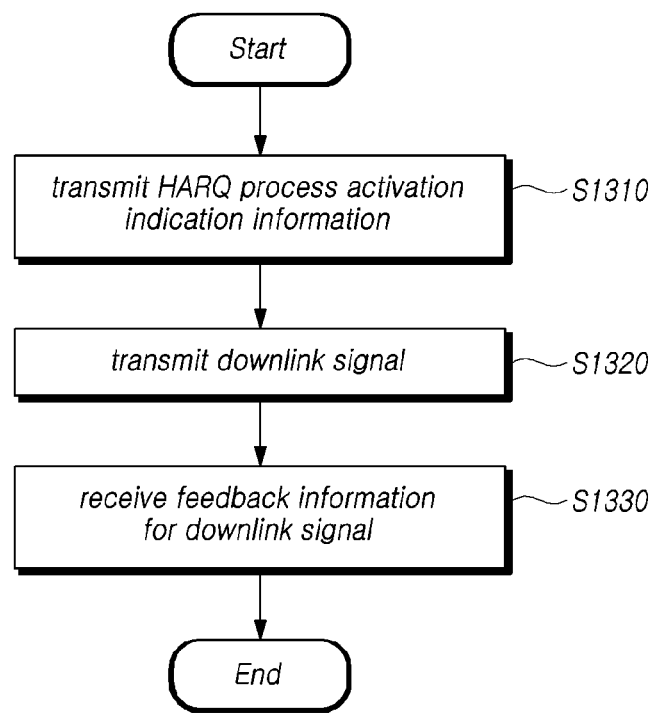
FIG. 13 is a flowchart for describing operations of a base station according to an embodiment.

FIG. 13 is a flowchart for describing operations of a base station according to an embodiment.

Referring to FIG. 13, a base station controlling the communication of a UE using a non-terrestrial network (NTN) may perform transmitting HARQ process activation indication information for indicating (e.g., instructing) whether to activate the HARQ process operation to the UE at step S1310.

The HARQ process activation indication information may include information for indicating (e.g., instructing) whether to activate the HARQ process operation to the UE. For example, the HARQ process activation indication information may be included in the RRC message. Alternatively, the HARQ process activation indication information may be included in the MAC CE signaling information. Alternatively, the HARQ process activation indication information may be included in the downlink control information.

For example, the HARQ process activation indication information may include information for indicating (e.g., instructing) whether to activate UE-specifically. In other words, all HARQ processes of the corresponding UE may be controlled to deactivate uplink feedback for downlink transmission. Alternatively, all HARQ processes of the corresponding UE may be controlled to deactivate uplink retransmission.

As another example, the HARQ process activation indication information may include information for indicating (e.g., instructing) whether to activate each HARQ process (or processor). In other words, the HARQ process activation indication information may indicate whether to activate a corresponding HARP process based on each HARQ process identification information. Alternatively, the HARQ process activation indication information may indicate whether to activate a corresponding HARP process based on each logical channel identification information or radio bearer identification information. Alternatively, the HARQ process activation indication information may indicate whether to activate a corresponding HARP process based on the HARQ process identification information associated with logical channel identification information or radio bearer identification information.

When the HARQ process activation indication information is received, the UE may control the HARQ process by applying the HARQ process activation indication information.

The base station may perform transmitting a downlink signal to the UE at step S1320.

The base station may transmit a downlink control channel or a downlink data channel to the UE for various reasons, such as downlink resource allocation and uplink resource allocation. In this case, a downlink signal may be transmitted to the UE in which the HARQ process has been controlled as inactive.

For example, the downlink signal may include at least one of i) information for indicating (e.g., instructing) downlink semi-persistent scheduling (SPS) activation or deactivation, ii) information for indicating (e.g., instructing) activation or deactivation for one or more uplink grants configured in the UE, iii) information for indicating (e.g., instructing) activation or deactivation for one or more SPS resources configured in the UE, and iv) information for indicating (e.g., instructing) activation or deactivation of channel state report.

If the UE determines to perform the HARQ process operation on the downlink signal, the base station may perform receiving feedback information about the downlink signal from the UE at step S1330.

In case that HARQ process operation is controlled to be deactivated by the HARQ process activation indication information, the UE may determine whether to perform the HARQ process on the downlink signal based on information included in a downlink signal when receiving the downlink signal. For example, if the downlink signal including the above-described information for indicating (e.g., instructing) downlink SPS activation or deactivation, the UE may perform the HARQ process operation on the downlink signal although the HARQ process is controlled to be deactivated.

Further, the feedback information for the downlink signal, including the reception identification information for the downlink signal, may be received through the MAC CE. Alternatively, the feedback information for the downlink signal, including HARQ feedback information about the downlink signal, may be received through the uplink control channel. In other words, the base station may receive the HARQ process result through the uplink control channel or receive a signal including only downlink signal reception identification information through the MAC CE.

The base station may perform additional operations corresponding to the above-described operation of the UE. Each operation may be divided into two or more operations, or two or more operations may be integrated into a single operation. Further, the order of each operation may be changed.

According to the UE and base station operations described above with reference to FIGS. 12 and 13, it is possible to perform the HARQ process operation even when the HARQ process is deactivated in consideration of a long delay time in the NTN.

Hereinafter, various embodiments of operations performed by the above-described UE and base station will be described. Each embodiment may be executed alone, or two or more embodiments or specific portions of two or more embodiments may be executed in combination. The above-described HARQ deactivation is described below as HARQ turn-off.

An Embodiment of Transmitting HARQ Feedback for PDCCH/PDSCH Indicating SPS Activation/Deactivation Even when HARQ is Turned Off Semi-persistent scheduling (SPS) is configured by RRC per serving cell or per BWP. For the DL SPS, a DL assignment is provided by PDCCH, and stored or cleared based on L1 signaling indicating SPS activation or deactivation.

For example, if a UE receives a PDSCH without receiving a corresponding PDCCH, or if the UE receives a PDCCH indicating a SPS PDSCH release, the UE generates one corresponding HARQ-ACK information bit. If the UE has not completely performed HARQ feedback for downlink transmission when the base station instructs the UE to be HARQ turn off, the base station may be not able to identify whether the UE has properly received SPS activation or deactivation. Thus, even when the base station instructs the UE to turn off the HARQ process, if the UE receives a PDCCH (or PDSCH) indicating SPS activation or deactivation, the UE may generate a corresponding HARQ-ACK information bit and transmit it to the base station.

For example, although the base station controls the UE to be HARQ turn off, if the UE receives a PDCCH indicating SPS PDSCH release, the UE may generate a corresponding HARQ-ACK information bit and transmit it to the base station. As another example, even when the base station instructs the UE to be HARQ turn off, if the UE receives a PDCCH indicating SPS activation, the UE may generate a corresponding HARQ-ACK information bit and transmit it to the base station. As still another example, even when the base station controls the UE to be HARQ turn off, if the UE receives one SPS PDSCH, the UE may generate a corresponding HARQ-ACK information bit and transmit it to the base station. As yet another example, although the base station controls the UE to be HARQ turn off, if the UE receives an SPS-activated SPS PDSCH, the UE may generate an HARQ-ACK information bit associated with reception of the SPS PDSCH and transmit it to the base station. As another example, even when the base station controls the UE to be HARQ turn off, if the UE receives a first SPS PDSCH for SPS activation, the UE may generate a corresponding HARQ-ACK information bit and transmit it to the base station. Here, the first SPS PDSCH may mean a first SPS PDSCH that arrives after the first SPS PDSCH or SPS PDSCH release after the SPS is configured by RRC. As another example, even when the base station instructs the UE to be HARQ turn-off, at least one HARQ process may be configured with the UL HARQ feedback in the turn-on state. Alternatively, a default HARQ process may be configured in which UL HARQ feedback is configured in the turn-on state. If receiving the PDCCH indicating the SPS PDSCH release or receiving the SPS-activated SPS PDSCH, the UE may generate a corresponding HARQ-ACK information bit using the HARQ process in which the UL HARQ feedback is configured in the turn-on state (e.g., the HARQ process indicated by the base station, the lowest HARQ process id, the available lowest HARQ process id, default HARQ process, or any HARQ process) and transmit it to the base station. As another example, even when the base station instructs the UE to be HARQ turn off, if information for indicating (e.g., instructing) to generate HARQ-ACK information (if the PDCCH indicating SPS PDSCH release is received, or SPS-activated SPS PDSCH, or new indication information for differentiating the same), the UE may generate a corresponding HARQ-ACK information bit and transmit it to the base station.

An Embodiment of Transmitting Identification Information of Receiving PDCCH/PDSCH Indicating SPS Activation/Deactivation to a Base Station in HARQ Turn Off.

If the UE has not completely performed HARQ feedback for downlink transmission when the base station instructs the UE to be HARQ turn off, the base station may be not able to identify whether the UE has properly received SPS activation or deactivation. Thus, when the base station instructs the UE to be HARQ turn off, if the UE receives a PDCCH (or PDSCH) indicating SPS activation or deactivation, the UE may generate identification information about reception of the corresponding SPS activation or deactivation and transmit it to the base station.

For example, a MAC CE for transmitting identify information may be defined, and the UE may transmit the MAC CE to the base station. The MAC CE may be defined separately each for SPS activation or deactivation through the LCID and may be defined to include one of a field for differentiating activation or deactivation through one LCID, a serving cell identifier field, and a BWP ID field. Alternatively, the MAC CE is one for identifying SPS activation or deactivation and may have a fixed zero-bit size. As another example, the UE may define an arbitrary L1 message included in the PUCCH to transmit identify information and transmit it to the base station. As another example, the UE may define an arbitrary L1 message included in the PUSCH to transmit identify information and transmit it to the base station.

An Embodiment of Transmitting HARQ Feedback/Identification Information for PDCCH/PDSCH Indicating Configured Grant Type 2 Activation/Deactivation Even Upon HARQ Turn Off Uplink configured grant type 2 is configured by RRC per serving cell and per BWP. In uplink configured grant type 2, one uplink grant is provided by PDCCH and is stored or released based on L1 signaling indicating configured uplink grant activation or deactivation.

The UE may validate the uplink configured grant type 2 PDCCH.

A UE validates, for scheduling activation or scheduling release, a DL SPS assignment PDCCH or configured UL grant Type 2 PDCCH if
  the CRC of a corresponding DCI format is scrambled with a CS-RNTI provided by cs-RNTI, and
  the new data indicator field for the enabled transport block is set to '0'.

Validation of the DCI format is achieved if all fields for the DCI format are set according to Table 10.2-1 or Table 10.2-2. If verification is achieved, the UE considers the information as valid activation or deactivation of configured UL grant type2. This operation is equally applied to the DL SPS.

For example, when the base station instructs the UE to be HARQ turn off (no uplink HARQ feedback), if the UE receives a PDCCH indicating configured uplink grant type 2 activation or deactivation, the UE may generate a corresponding HARQ-ACK information bit and transmit it to the base station. Alternatively, when the base station controls the UE to be HARQ turn off (no uplink HARQ feedback), if the UE receives the PDSCH in which configured uplink grant type 2 is activated, the UE may generate a corresponding HARQ-ACK information bit and transmit it to the base station. Alternatively, when the base station instructs the UE to be HARQ turn off (no uplink HARQ feedback), if the UE receives a first PDSCH for configured uplink grant type 2 activation, the UE may generate a corresponding HARQ-ACK information bit and transmit it to the base station. Here, the first configured uplink grant type 2 PDSCH may mean the first configured uplink grant PDSCH after the SPS is configured by RRC or the first configured uplink grant PDSCH after configured uplink grant type 2 deactivation. As another example, even when the base station instructs the UE to be HARQ turn-off, at least one HARQ process may be configured (e.g., controlled) to transmit the UL HARQ feedback. Alternatively, a default HARQ process may be configured to turn on UL HARQ feedback. If receiving the PDSCH that activate configured uplink grant type 2, the UE may generate a corresponding HARQ-ACK information bit using the HARQ process configured to turn on UL HARQ feedback (e.g., the HARQ process indicated by the base station, the lowest HARQ process id, the available lowest HARQ process id, default HARQ process, or any HARQ process) and transmit it to the base station. As another example, even when the base station instructs the UE to be HARQ turn off, if information for indicating (e.g., instructing) to generate HARQ-ACK information (PDSCH in which configured uplink grant type 2 is activated or new indication information for differentiating the same), the UE may generate a corresponding HARQ-ACK information bit and transmit it to the base station.

As another example, when the base station instructs the UE to be HARQ turn off (no uplink HARQ feedback), if the UE receives a PDCCH (or PDSCH) indicating configured uplink grant type 2 activation or deactivation, the UE may generate identification information for reception of the configured uplink grant type 2 activation or deactivation information and transmit it to the base station. For example, the UE may transmit an existing configured grant confirmation MAC CE using LCID 55 to the base station. As another example, a MAC CE using a new LCID that is distinct from the configured grant confirmation MAC CE may be defined, and the UE may transmit it to the base station. The MAC CE may be defined separately each for activation or deactivation through the LCID and may be defined to include one of a field for differentiating activation or deactivation through one LCID, a serving cell identifier field, a BWP ID field, and a field for differentiating the SPS or configured uplink grant. Alternatively, the MAC CE may have a fixed zero-bit size. As another example, to that end, an arbitrary L1 message included in the PUCCH may be defined, and the UE may transmit it to the base station. As another example, to that end, an arbitrary L1 message included in the PUSCH may be defined, and the UE may transmit it to the base station.

An Embodiment of Transmitting an HARQ Feedback/Identification Signal for a PDSCH that Needs to Provide Arbitrary Information to a Base Station Through HARQ-ACK Even Upon HARQ Turn Off The HARQ ACK may be used to transfer indication, to the base station, that the UE has properly received the command information carried/included by the corresponding PDSCH. The UE must perform a specific operation according to the command information carried by the corresponding PDSCH. Accordingly, the base station also aligns operations with the UE to perform communication.

For example, a UE shall perform semi-persistent CSI reporting on the PUCCH applied starting from slot $n+3N_{slot}^{subframe,\mu}+1$ after the HARQ-ACK corresponding to the PDSCH carrying the selection command [10, TS 38.321] is transmitted in slot n. The selection command will contain one or more Reporting Settings where the associated CSI Resource Settings are configured. If the HARQ-ACK corresponding to the PDSCH carrying the corresponding command is not transmitted, the timings for the base station and the UE to perform semi-static CSI reporting on the PUCCH may not be aligned. Thus, when the base station instructs the UE to be HARQ turn off (no uplink HARQ feedback), if the UE receives the PDSCH carrying the selection command of TS 38.321, the UE may generate a corresponding HARQ-ACK information bit and transmit it to the base station.

For example, the selection command may be SP CSI reporting on PUCCH activation/deactivation MAC CE for activating/deactivating semi-static CSI reporting configured on the PUCCH of the serving cell.

As another example, for a UE with a configuration of one or more SRS resources and when SRS resources are semi-statically set by a higher layer parameter, when the UE receives an activation/deactivation command for SRS resources, and when the HARQ-ACK corresponding to the PDSCH carrying the selection command of TS 38.321 is transmitted in slot n, the UE makes a specific assumption about SRS transmission/end timing. For a UE configured with one or more SRS resource configuration(s), and when the higher layer parameter resourceType in SRS-Resource is set to 'semi-persistent':

when a UE receives an activation command [10, TS 38.321] for an SRS resource, and when the HARQ-ACK corresponding to the PDSCH carrying the selection command is transmitted in slot n, the corresponding actions in [10, TS 38.321] and the UE assumptions on SRS transmission corresponding to the configured SRS resource set shall be applied starting from slot $n+3N_{slot}^{subframe,\mu}+1$. The activation command also contains spatial relation assumptions provided by a list of references to reference signal IDs, one per element of the activated SRS resource set. Each ID in the list refers to a reference SS/PBCH block, NZP CSI-RS resource configured on serving cell indicated by Resource Serving Cell ID field in the activation command if present, same serving cell as the SRS resource set otherwise, or SRS resource configured on serving cell and uplink bandwidth part indicated by Resource Serving Cell ID field and Resource BWP ID field in the activation command if present, same serving cell and bandwidth part as the SRS resource set otherwise.

if an SRS resource in the activated resource set is configured with the higher layer parameter spatialRelationInfo, the UE shall assume that the ID of the reference signal in the activation command overrides the one configured in spatialRelationInfo.

when a UE receives a deactivation command [10, TS 38.321] for an activated SRS resource set, and when the HARQ-ACK corresponding to the PDSCH carrying the selection command is transmitted in slot n, the corresponding actions in [10, TS 38.321] and UE assumption on cessation of SRS transmission corresponding to the deactivated SRS resource set shall apply starting from slot $n+3N_{slot}^{subframe,\mu}+1$.

If the HARQ-ACK corresponding to the PDSCH carrying the corresponding command is not transmitted, the timings for the base station and the UE to perform SRS transmission may not be aligned. Thus, when HARQ turn off (no uplink HARQ feedback) is indicated to the UE by the base station, if the UE receives the PDSCH carrying the selection command of TS 38.321, the UE may generate a corresponding HARQ-ACK information bit and transmit it to the base station. As an example, the selection command may be SP SRS activation/deactivation MAC CE for activating/deactivating the configured semi-static SRS resource set of the serving cell.

As another example, a case in which the UE receives a PDSCH including a MAC CE for indicating (e.g., instructing) a semi-static CSI-RS/CSI-IM resource set is the same as in the above-described embodiment. (Semi-persistent reporting on PUCCH is activated by an activation command [10, TS 38.321], which selects one of the semi-persistent Reporting Settings for use by the UE on the PUCCH. When the HARQ-ACK corresponding to the PDSCH carrying the activation command is transmitted in slot n, the indicated semi-persistent Reporting Setting should be applied starting from slot $n+3N_{slot}^{subframe,\mu}+1$.

For a UE configured with CSI resource setting(s) where the higher layer parameter resource Type set to 'semiPersistent'.

when a UE receives an activation command [10, TS 38.321] for CSI-RS resource set(s) for channel measurement and CSI-IM/NZP CSI-RS resource set(s) for interference measurement associated with configured CSI resource setting(s), and when the HARQ-ACK corresponding to the PDSCH carrying the selection command is transmitted in slot n, the corresponding actions in [10, TS 38.321] and the UE assumptions (including QCL assumptions provided by a list of reference to TCI-State's, one per activated resource) on CSI-RS/CSI-IM transmission corresponding to the configured CSI-RS/CSI-IM resource configuration(s) shall be applied starting from slot $n+3N_{slot}^{subframe,\mu}+1$. If a TCI-State referred to in the list is configured with a reference to an RS associated with 'QCL-TypeD', that RS can be an SS/PBCH block, periodic or semi-persistent CSI-RS located in same or different CC/DL BWP.

when a UE receives a deactivation command [10, TS 38.321] for activated CSI-RS/CSI-IM resource set(s) associated with configured CSI resource setting(s), and when the HARQ-ACK corresponding to the PDSCH carrying the selection command is transmitted in slot n, the corresponding actions in [10, TS 38.321] and UE assumption on cessation of CSI-RS/CSI-IM transmission corresponding to the deactivated CSI-RS/CSI-IM resource set(s) shall apply starting from slot $n+3N_{slot}^{subframe,\mu}+1$.)

Thus, when the base station instructs the UE to be HARQ turn off (no uplink HARQ feedback), if the UE receives the PDSCH carrying the selection command of TS 38.321, the UE may generate a corresponding HARQ-ACK information bit and transmit it to the base station. For example, the selection command may be SP CSI-RS/CSI-IM resource set activation/deactivation MAC CE for activating/deactivating the semi-static SRS resource set configured in the serving cell.

As another example, a case in which the UE receives a PDSCH including a MAC CE for indicating a UE-specific PDSCH TCI state MAC CE or a semi-static ZP CSI-RS resource set may be applied in the same manner as in the above-described embodiment.

As another example, even when the base station instructs the UE to be HARQ turn-off, at least one HARQ process may be configured to turn on the UL HARQ feedback. Alternatively, a default HARQ process may be configured to turn on UL HARQ feedback. If receiving a PDSCH including a MAC CE activation/deactivation indication or the above-described MAC CE or an arbitrary MAC CE, the UE may generate a corresponding HARQ-ACK information bit using the HARQ process that turns on the UL HARQ feedback (e.g., the HARQ process indicated by the base station, the lowest HARQ process id, the available lowest HARQ process id, default HARQ process, or any HARQ process) and transmit it to the base station. As another example, even when the base station instructs the UE to be HARQ turn off, if information for indicating (e.g., instructing) to generate HARQ-ACK information (the PDSCH including the MAC CE activation/deactivation indication or above-described MAC CE or arbitrary MAC CE or new indication information for differentiating the same), the UE may generate a corresponding HARQ-ACK information bit and transmit it to the base station.

As another example, when the base station instructs the UE to be HARQ turn off (no uplink HARQ feedback), if the UE receives a PDSCH carrying/including the above-described arbitrary MAC CE, the UE may generate identification information for reception of the information and transmit it to the base station. As an example, an uplink MAC CE using a new LCID may be defined, and the UE may transmit it to the base station. The MAC CE may be defined separately each for activation or deactivation through the LCID and may be defined to include at least one of a field for differentiating activation or deactivation through one LCID, a serving cell identifier field, a BWP ID field, and a field for differentiating the above-described MAC CE in the instant embodiment (e.g., SP CSI reporting on PUCCH Activation/Deactivation MAC CE, SP SRS Activation/Deactivation MAC CE etc.). Alternatively, the MAC CE may have a fixed zero-bit size. As another example, to that end, an arbitrary L1 message included in the PUCCH may be defined, and the UE may transmit it to the base station. As another example, to that end, an arbitrary L1 message included in the PUSCH may be defined, and the UE may transmit it to the base station.

Meanwhile, information for instructing to separately perform the operation of each embodiment described above may be configured in the UE through the RRC message.

As described above, according to the embodiments of the present disclosure, it is possible to effectively control the HARQ feedback operation for a UE serviced through a non-terrestrial network.

Hereinafter, hardware and software configurations of a UE and a base station capable of performing all of the above-described embodiments will be described in detail with reference to the accompanying drawings.

Figure 14:
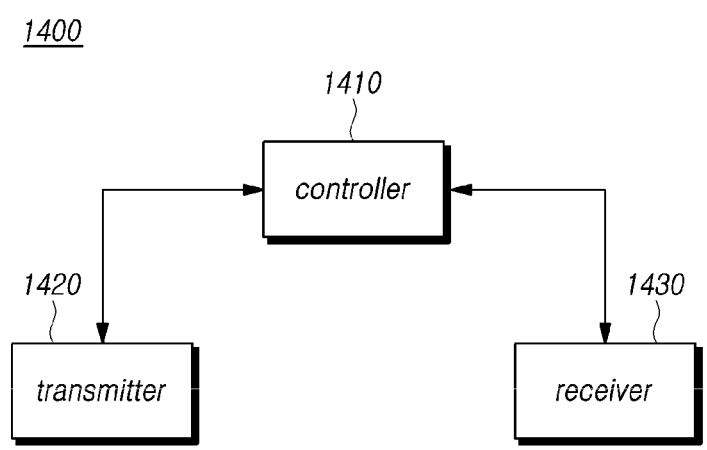
FIG. 14 is a block diagram illustrating a UE according to an embodiment.

FIG. 14 is a block diagram for illustrating a UE according to an embodiment.

Referring to FIG. 14, a UE 1400 performing communication using a non-terrestrial network (NTN) includes a receiver 1430 configured to receive, from a base station, HARQ process activation indication information indicating whether to activate an HARQ process operation, a controller 1410 configured to determine whether to perform an HARQ process operation on a downlink signal based on information included in the downlink signal if the downlink signal is received from the base station when HARQ process operation is deactivated by the HARQ process activation indication information, and a transmitter 1420 configured to transmit feedback information for the downlink signal to the base station if it is determined to perform the HARQ process operation on the downlink signal.

The HARQ process activation indication information may include information for instructing the UE (e.g. indicating) whether to activate the HARQ process operation. As an example, the HARQ process activation indication information may be included in the RRC message. Alternatively, the HARQ process activation indication information may be included in the MAC CE signaling information. Alternatively, the HARQ process activation indication information may be included in the downlink control information.

For example, the HARQ process activation indication information may include information indicating (e.g., instructing) whether to activate the HARQ process UE-specifically. In other words, all HARQ processes configured in the corresponding UE may deactivate uplink feedback for downlink transmission. Alternatively, all HARQ processes configured in the corresponding UE may deactivate uplink retransmission.

As another example, the HARQ process activation indication information may include information indicating (e.g., instructing) whether to activate each HARQ process (or processor). In other words, the HARQ process activation indication information may indicate (e.g., instructing) whether to activate for each HARQ process identification information. Alternatively, the HARQ process activation indication information may indicate whether to activate for each logical channel identification information or radio bearer identification information. Alternatively, the HARQ process activation indication information may indicate whether to activate, with the HARQ process identification information associated with logical channel identification information or radio bearer identification information.

If the HARQ process activation indication information is received, the controller 1410 may configure (e.g., control) the HARQ process by applying the HARQ process activation indication information.

Further, even when the HARQ process is configured (e.g., controlled) as an inactive state according to the HARQ process activation indication information, the controller 1410 may dynamically determine whether to perform the HARQ process operation based on information included in the downlink signal. Here, the downlink signal may mean a PDCCH including downlink control information or a PDSCH including downlink data, and it may mean various signals that the base station transmits to the UE.

For example, when the downlink signal includes information indicating activation or deactivation of downlink semi-persistent scheduling (SPS), the controller 1410 may determine to perform the HARQ process operation on the downlink signal. Alternatively, if information indicating SPS activation or deactivation is received, the controller 1410 may control the HARQ process to be performed even though the HARQ process is configured as an inactive state by the RRC message. Alternatively, when information indicating SPS activation or deactivation is received, the controller 1410 may control transmitting the MAC CE including identification information identifying that the information has been received to the base station.

As another example, when the downlink signal includes information indicating activation or deactivation of one or more uplink grants configured in the UE, the controller 1410 may determine to perform the HARQ process operation on the downlink signal. Information indicating activation or deactivation of one or more uplink grants may mean uplink grant type 2. As described above, if uplink grant type 2 is received, the controller 1410 may control the HARQ process to be performed even when the HARQ process is configured to be inactive by the RRC message. Alternatively, if uplink grant type 2 is received, the controller 1410 may perform operation for transmitting the MAC CE including identification information identifying that the information has been received to the base station.

As another example, when the downlink signal is information indicating activation or deactivation of one or more SRS resources configured in the UE or information indicating activation or deactivation of a channel state report, the UE may determine to perform the HARQ process operation on the downlink signal. As described above, if information indicating activation or deactivation for one or more SRS resources is received, the controller 1410 may control the HARQ process to be performed even when the HARQ process is configured to be inactive by the RRC message. Likewise, if information indicating channel state report activation or deactivation is received, the controller 1410 may control the HARQ process to be performed even when the HARQ process is in an inactive state by the RRC message. Alternatively, if information indicating activation or deactivation for one or more SRS resources or information indicating activation or deactivation of channel state report is received, the controller 1410 may perform operation for transmitting the MAC CE including identification information identifying that the information has been received to the base station.

Meanwhile, the feedback information for the downlink signal, including the reception identification information for the downlink signal, may be transmitted through the MAC CE. Alternatively, the feedback information for the downlink signal, including HARQ feedback information generated as a result of the HARQ process operation on the downlink signal, may be transmitted through the uplink control channel. Whether to use the transmission using the MAC CE or the transmission using the uplink control channel may be determined according to the type of the downlink signal described above or may be determined by the control of the base station.

Besides, in the HARQ feedback control method necessary for performing the above-described embodiments, the controller 1410 controls the overall operation of the UE 1400 according to performing the HARQ feedback operation in a certain circumstance without performing HARQ through the non-terrestrial network.

The transmitter 1420 and the receiver 1430 are configured to transmit or receive signals or messages or data necessary for performing the above-described embodiments, with the base station.

Figure 15:
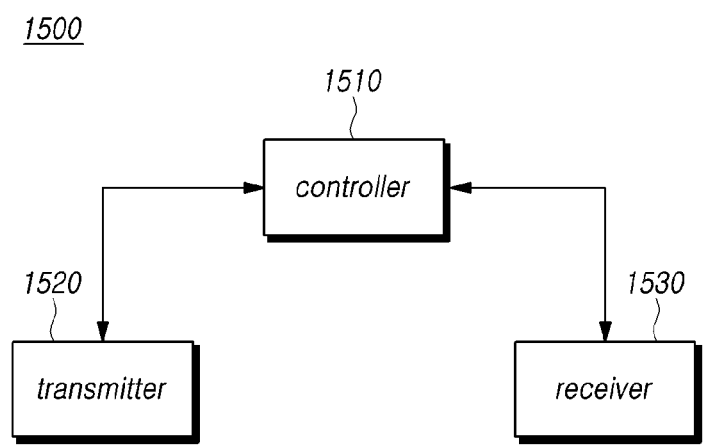
FIG. 15 is a block diagram illustrating a base station according to an embodiment.

FIG. 15 is a block diagram for describing a base station according to an embodiment.

Referring to FIG. 15, a base station 1500 for controlling communication of a UE using a non-terrestrial network (NTN) may include a transceiver 1520 configured to transmit, to the UE, an HARQ process activation indication information indicating (e.g., instructing) whether to activate an HARQ process operation and transmitting a downlink signal to the UE and a receiver 1510 configured to receive feedback information for the downlink signal from the UE if the UE determines to perform the HARQ process operation on the downlink signal. When HARQ process operation deactivation is configured by the HARQ process activation indication information, if the downlink signal is received, the UE determines whether to perform the HARQ process operation on the downlink signal based on information included in the downlink signal.

The HARQ process activation indication information may include information indicating (e.g., instructing) whether to activate the HARQ process operation to the UE. As an example, the HARQ process activation indication information may be included in the RRC message. Alternatively, the HARQ process activation indication information may be included in the MAC CE signaling information. Alternatively, the HARQ process activation indication information may be included in the downlink control information.

For example, the HARQ process activation indication information may include information indicating (e.g., instructing) whether to activate the HARQ process UE-specifically. In other words, all HARQ processes configured in the corresponding UE may deactivate uplink feedback for downlink transmission. Alternatively, all HARQ processes configured in the corresponding UE may deactivate uplink retransmission.

As another example, the HARQ process activation indication information may include information indicating whether to activate each HARQ process (or processor). In other words, the HARQ process activation indication information may indicate whether to activate for each HARQ process identification information. Alternatively, the HARQ process activation indication information may indicate whether to activate for each logical channel identification information or radio bearer identification information. Alternatively, the HARQ process activation indication information may indicate whether to activate, with the HARQ process identification information associated with logical channel identification information or radio bearer identification information.

When the HARQ process activation indication information is received, the UE may configure the HARQ process by applying the HARQ process activation indication information.

The transmitter 1520 may transmit a downlink control channel or a downlink data channel to the UE for various reasons, such as downlink resource allocation and uplink resource allocation. In this case, the transmitter 1520 may transmit a downlink signal to the UE configured (e.g., controlled) not to perform the HARQ process (e.g., as inactive).

For example, the downlink signal may include at least one of information indicating (e.g., instructing) downlink semi-persistent scheduling (SPS) activation or deactivation, information indicating (e.g., instructing) activation or deactivation for one or more uplink grants configured in the UE, information indicating (e.g., instructing) activation or deactivation for one or more SPS resources configured in the UE, and information indicating activation or deactivation of channel state report.

In a case where HARQ process operation is deactivated by the HARQ process activation indication information, if a downlink signal is received, the UE may determine whether to perform the HARQ process on the downlink signal based on information included in the downlink signal. For example, if the downlink signal including the above-described information indicating downlink SPS activation or deactivation, the UE may perform the HARQ process operation on the downlink signal although the HARQ process deactivation is configured.

Further, the feedback information for the downlink signal, including the reception identification information for the downlink signal, may be received through the MAC CE. Alternatively, the feedback information for the downlink signal, including HARQ feedback information about the downlink signal, may be received through the uplink control channel. In other words, the base station may receive the HARQ process result through the uplink control channel or receive a signal including only downlink signal reception identification information through the MAC CE.

Besides, in the HARQ feedback control method necessary for performing the above-described embodiments, the controller 1510 controls the overall operation of the base station 1500 according to performing the HARQ feedback operation in a certain circumstance without performing HARQ through the non-terrestrial network.

The transmitter 1520 and the receiver 1530 are configured to transmit or receive signals or messages or data necessary for performing the above-described embodiments, with the UE.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the disclosure shall be construed on the basis of the accompanying claims in such a manner that all of the technical ideas included within the scope equivalent to the claims belong to the disclosure.

The invention claimed is:

1. A method for performing communication by a user equipment (UE) using a non-terrestrial network (NTN), the method comprising:
   receiving, from a base station, hybrid automatic repeat request (HARQ) process activation indication information that indicates whether to activate an HARQ process operation;
   determining whether to perform the HARQ process operation on a downlink signal based on the downlink signal if the downlink signal is received from the base station when HARQ process operation is deactivated by the HARQ process activation indication information; and
   transmitting, to the base station, feedback information for the downlink signal if it is determined to perform the HARQ process operation on the downlink signal,
   wherein the feedback information for the downlink signal includes HARQ feedback information for the downlink signal and is transmitted through an uplink control channel.

2. The method of claim 1, wherein the HARQ process activation indication information is included in an radio resource control (RRC) message.

3. The method of claim 1, wherein determining whether to perform the HARQ process operation determines to perform the HARQ process operation on the downlink signal when the downlink signal is a semi-persistent scheduling (SPS) PDSCH.

4. The method of claim 3, wherein the downlink signal is a first SPS PDSCH after SPS is activated, the determining whether to perform the HARQ process operation includes determining to perform the HARQ process operation on the downlink signal based on an RRC message indicating performance of the HARQ process operation on the first SPS PDSCH.

5. A method for controlling communication of a user equipment (UE) by a base station using a non-terrestrial network (NTN), the method comprising:
   transmitting, to the UE, hybrid automatic repeat request (HARQ) process activation indication information indicating whether to activate an HARQ process operation;
   transmitting a downlink signal to the UE; and
   if the UE determines to perform an HARQ process operation on the downlink signal, receiving feedback information for the downlink signal from the UE,
   wherein the UE determines whether to perform the HARQ process operation on the downlink signal based on the downlink signal if the downlink signal is received when HARQ process operation is deactivated by the HARQ process activation indication information,
   wherein the feedback information for the downlink signal includes HARQ feedback information for the downlink signal and is transmitted through an uplink control channel.

6. The method of claim 5, wherein the HARQ process activation indication information is included in an radio resource control (RRC) message.

7. The method of claim 5, wherein the downlink signal is a semi-persistent scheduling (SPS) PDSCH,
   the UE determines to perform the HARQ process operation on the downlink signal when the downlink signal is the semi-persistent scheduling (SPS) PDSCH.

8. A user equipment (UE) performing communication using a non-terrestrial network (NTN), the UE comprising:
   a receiver configured to receive, from a base station, hybrid automatic repeat request (HARQ) process activation indication information indicating whether to activate an HARQ process operation;
   a controller configured to determine whether to perform the HARQ process operation on a downlink signal based on the downlink signal if the downlink signal is received from the base station when HARQ process operation is deactivated by the HARQ process activation indication information; and
   a transmitter configured to transmit, to the base station, feedback information for the downlink signal if it is determined to perform the HARQ process operation on the downlink signal,
   wherein the feedback information for the downlink signal includes HARQ feedback information for the downlink signal and is transmitted through an uplink control channel.

9. The UE of claim 8, wherein the HARQ process activation indication information is included in an radio resource control (RRC) message.

10. The UE of claim 8, wherein the controller determines to perform the HARQ process operation on the downlink signal when the downlink signal is a semi-persistent scheduling (SPS) PDSCH.

11. The UE of claim 10, wherein the downlink signal is a first SPS PDSCH after SPS is activated, the controller determines to perform the HARQ process operation on the downlink signal based on an RRC message indicating performance of the HARQ process operation on the first SPS PDSCH.

* * * * *